(No Model.)
C. F. JANNSEN.
VEHICLE.
No. 548,993. Patented Oct. 29, 1895.
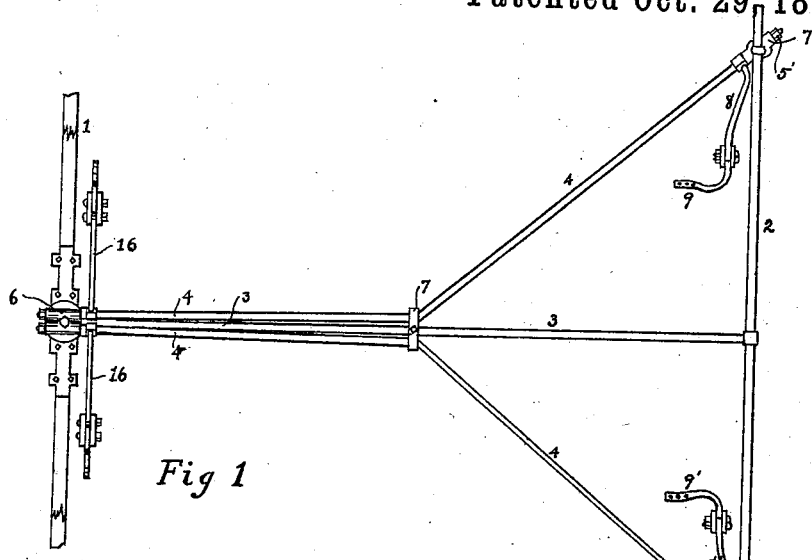
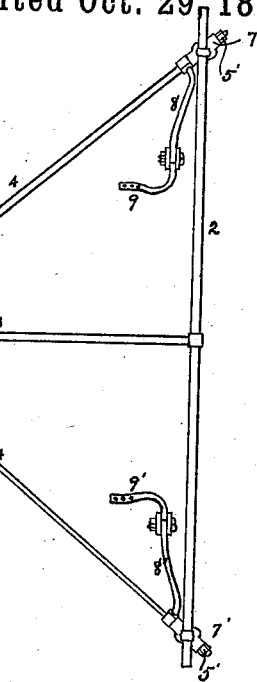
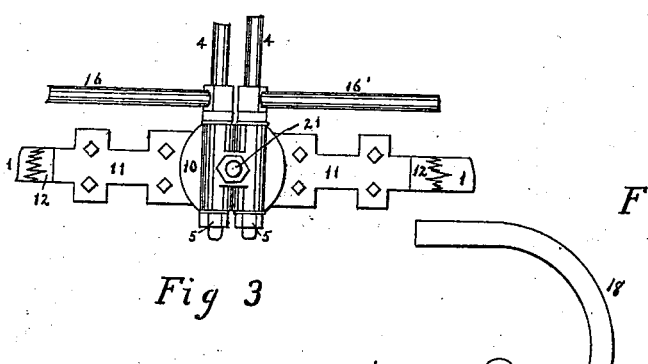
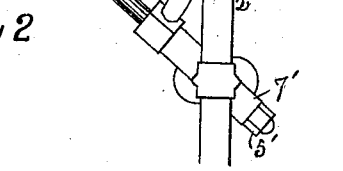
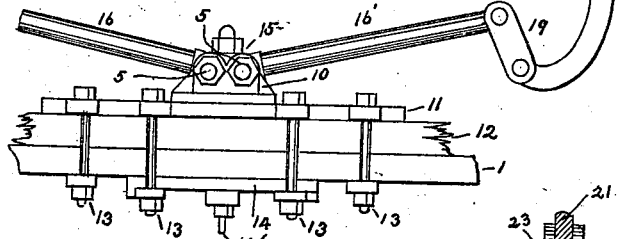
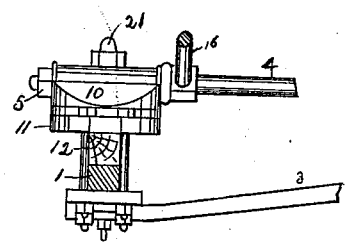
Witnesses
Marie Reiman
Frank L. Stone.
Inventor
Charles F. Jannsen
by Harold A. Weld
Atty.

UNITED STATES PATENT OFFICE.

CHARLES F. JANNSEN, OF ROCK ISLAND, ILLINOIS.

VEHICLE.

SPECIFICATION forming part of Letters Patent No. 548,993, dated October 29, 1895.

Application filed April 10, 1895. Serial No. 545,221. (No model.)

*To all whom it may concern:*

Be it known that I, CHARLES F. JANNSEN, a citizen of the United States, residing at Rock Island, in the county of Rock Island, in the State of Illinois, have invented certain new and useful Improvements in Vehicles, of which the following is a specification.

My invention relates to all classes of vehicles wherein springs are or may be interposed between the box and the axles. Its leading object is to provide springs of torsion instead of flexure commonly employed.

Another leading object is to construct the reach whereby the front and rear axles of the vehicle are connected as to utilize it as a spring.

A third object is to provide an improved head-block, which will also answer the purpose of a fifth-wheel and enable that part of the vehicle to be dispensed with.

A fourth object is to provide an improved attachment for the king-bolt to the axle, so as to prevent its slipping.

A fifth object is so to combine, construct, and assemble the parts of the vehicle as to render it cheap, light, durable, and convenient.

The objects are attained by means of the devices and parts and the construction, combination, and assembling of devices and parts set forth and claimed hereinafter.

In the drawings accompanying and forming a part of this specification, wherein the several parts are designated by the same figures of reference in the several views, Figure 1 is a top plan view of a vehicle embodying my improvements with box and wheels removed. Fig. 2 is a detail view showing the manner of attachment of the spring-reach of the rear axle. Fig. 3 is an enlarged plan view of the head-block. Fig. 4 is a front elevation of the front axle and head-block. Fig. 5 is a side elevation of the same, showing the axle in section. Fig. 6 is a transverse vertical section of the parts shown in Fig. 5.

In the drawings, 1 represents the front axle; 2, the rear axle; 3, a brace pivotally bolted under the center of the front axle, extending and fastened to the center of the rear axle.

4 is the spring-reach, consisting of two rods, preferably constructed of spring-steel, extending from the head-block 6, in which they are journaled, backward in parallel lines to a point midway the length of the vehicle, where they are rigidly held by a clip-block 7 and prevented from twisting at that point. Thence they diverge backward to the rear axle, below which they are held in sleeve-journals 7 7', bolted or clipped to the axle near the wheels.

Lever-arms 8 8' extend inward and upward from the rods of the spring-reach 4 near their rear extremities, which are connected by hinges or links to the rear body-loops 9 9' at the rear of the box. (Not shown.) Similar lever-arms 16 16' extend outward and upward and are connected by the link 19 with the front body-loops 18. Each of the rods composing the spring-reach is thus confined at its center and is free to revolve or twist at both ends, and the weight of the box is sustained upon the extremities of the arms 9 9' and 16 16', so that the said rods act as torsion-springs. The ends of the rods are held from slipping out of their bearings by nuts 5 5' on their front and rear, so that the rods also act as the reach of the vehicle. The length of the lever-arms 8 8' 16 16' may be varied as is necessary or desirable.

Above the front axle 1 and the axle-bed 12 upon it is a plate firmly held by bolts 13 13'. A plate 14, held below the axle by two bolts 13 nearest the center of the axle, bears a pin 14, projecting downward and forming a pivot for the front end of the brace 3.

The king-bolt 21 is made integral with the plate 11 and extends upward from its center. Around the king-bolt as a center is a circular flange 22, Fig. 6, on the upper surface of the plate 11.

The head-block 23 has a circular flange 24 on the bottom adapted to fit outside the plate-flange 22 and has two horizontal perforations for the reception of the front ends of the reach-rods 4. It is also perforated vertically at its center for the reception of the king-bolt 21, upon which it turns as a pivot, bearing upon the plate 11, the flange 22 preventing too great strain upon the king-bolt. The king-bolt is thus held firmly in place without liability of slipping, and the head-block turning on the plate 11 answers the purpose of a fifth-wheel.

It is evident that each of the rods composing the reach 4, so far as they are used as springs, is equivalent to two rods—that is, the parts in front and rear of the clip-block 7 act independently, and except for their use as a reach they might be separate rods.

Having thus described my invention, what I claim as new, and desire to secure by Letters Patent, is—

In a vehicle, the frame, the front and rear axles, the rods revolubly supported from the front axle and running parallel rearwardly, said rods being rigidly connected to the frame at the center thereof, the rear end of said rods diverging from said connecting point and being revolubly supported from the rear axle, and the connections from said rods said connections being adapted to support the boxing, substantially as described.

CHARLES F. JANNSEN.

Witnesses:
HAROLD A. WELD,
NELLIE M. SWAYNE.